R. S. BASSETT.
LIQUID METER.
APPLICATION FILED MAR. 22, 1920.

1,413,214.

Patented Apr. 18, 1922.

WITNESSES:
W. J. Chellew
Earl R Ryder

INVENTOR
Robert S. Bassett

UNITED STATES PATENT OFFICE.

ROBERT S. BASSETT, OF BUFFALO, NEW YORK.

LIQUID METER.

1,413,214.  Specification of Letters Patent.  Patented Apr. 18, 1922.

Application filed March 22, 1920. Serial No. 367,648.

*To all whom it may concern:*

Be it known that I, ROBERT S. BASSETT, a citizen of the United States, residing at Buffalo, in the county of Erie and State of New York, have invented new and useful Improvements in Liquid Meters, of which the following is a specification.

This invention relates to liquid meters of the dispensing type and has for its object the registering of the quantity of liquid passing through the meter in two denominations. Other objects of my present invention are principally to improve the construction and arrangement of parts in these meters for the pupose of facilitating the changing of dials, reducing the cost of manufacture, increasing the durability and efficiency and giving other advantageous results.

I will now proceed to definitely describe the manner in which I have carried out my invention and then claim what I believe to be novel.

Figure 2:
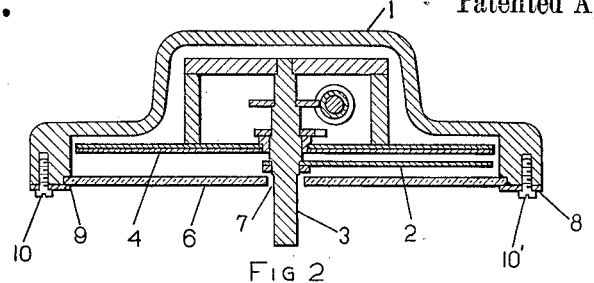
Figure 1:
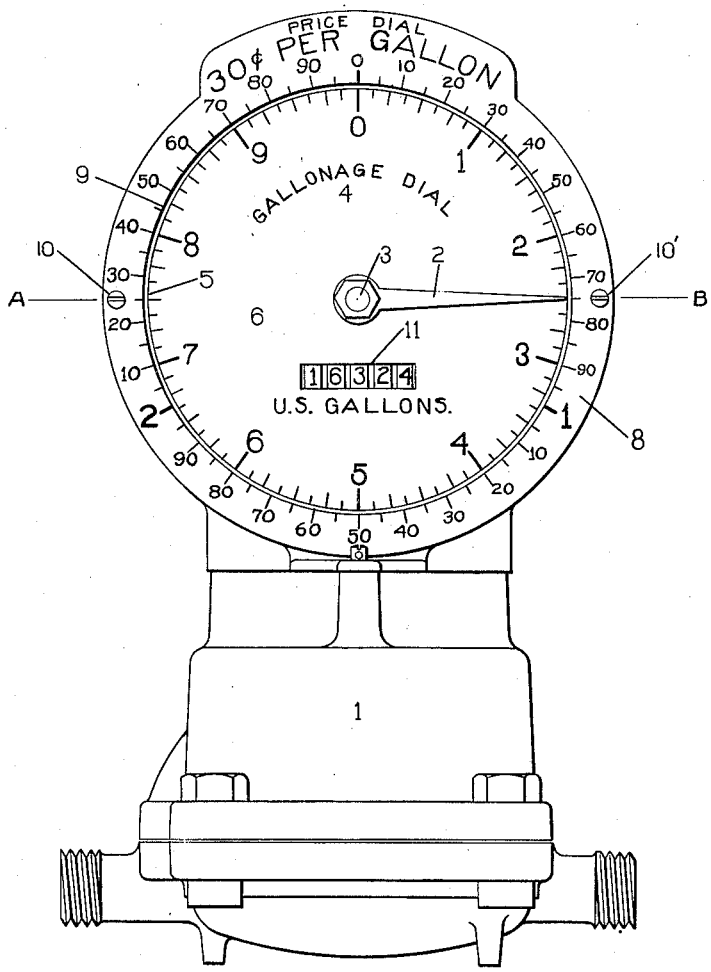

In the accompanying drawings, Figure 1 is a face view of my improved meter; Figure 2 is a sectional view taken along line AB of Figure 1.

Referring to the drawings; 1 is the main casing of the meter which contains any suitable measuring mechanism adapted to operate indicator hand 2, which is mounted on the set back spindle 3 in the center of gallonage dial 4 which is shown having a circle 5 graduated.

6 is a glass covering the gallonage dial 4 and indicator hand 2 and having in its center a hole 7 through which the spindle 3 projects so that by turning the spindle 3 with the fingers the indicator hand 2 may be turned back to zero. Covering glass 5 is held in position by means of a removable price dial 8 having a large circular hole 9 registering centrally with the graduated circle 5 of the gallonage dial 4 and removably fastened to the meter case 1 by screws 10 and 10¹.

The face of price dial 8 is shown graduated around circular hole 9 in dollars and cents on the basis that one gallon is equal to 30¢. 11 is a straight reading register showing through a slot cut in gallonage dial 4 and which is arranged to record the total summation of any several registrations shown by indicator hand 2.

To describe the use of my improved meter I will be concrete. Let the meter be inserted in a pipe dispensing gasoline at 30 cents per gallon. A customer asks for 2½ gallons of gasoline. The dispenser sets hand 2 at zero and draws off 2½ gallons as it indicates on the gallonage dial 4 and at the same time reads the price for same as 75 cents on the price dial 8 without calculation. Another customer asks for 2 dollars worth of gasoline and the dispenser sets hand 2 back to zero and draws off 2 dollars worth as it indicates on the price dial 8 without any calculation. Both the 2½ gallon sale and the number of gallons to make the 2 dollar sale being totaled automatically on straight reading of the register 11 without any calculation.

Should the price of gasoline be changed to say 25 cents a gallon, the removable price dial 8 may be quickly replaced with a new dial 8 having the proper graduation without removing the hand 2 or disturbing the gallonage dial.

I do not wish to confine my invention to use of two dials indicating gallons and dollars only, which I have here used for purposes of illustration, as it is equally well adapted to indicate in any other two denominations as litres and francs, or in places where liquids are compounded one dial may indicate gallons and the other litres.

Having thus described my invention what I claim and wish to secure by Letters Patent is—

1. A liquid meter comprising a main casing, a graduated dial, an indicator hand, a glass covering said dial and the space in which said hand revolves, and a graduated retaining ring positively fastened to the said main casing and holding said glass in place, said retaining ring forming a rigid and non-adjustable supplementary indicating dial, substantially as and for the purpose described.

2. A liquid meter comprising a main casing, a straight-reading register, an indicator hand coacting with said straight-reading register, a glass covering said straight-reading register and the space in which said hand revolves, and a graduated retaining ring positively fastened to said main casing and holding said glass in place, said retaining ring forming a rigid and non-adjustable supplementary indicating dial, substantially as and for the purpose described.

ROBERT S. BASSETT.

Witnesses:
W. J. CHELLEW,
EARL R. RYDER.